(12) United States Patent
Hartsook et al.

(10) Patent No.: US 8,019,770 B1
(45) Date of Patent: Sep. 13, 2011

(54) DYNAMIC RENDERING OF CONTENT THAT INCLUDES QUERY EXPRESSIONS

(75) Inventors: Lawrence D. Hartsook, Fremont, CA (US); Brian R. Kenville, Redwood Valley, CA (US)

(73) Assignee: M. A. Mobile Ltd. (DM)

( * ) Notice: Subject to any disclaimer, the term of this patent is extended or adjusted under 35 U.S.C. 154(b) by 621 days.

(21) Appl. No.: 09/788,311

(22) Filed: Feb. 15, 2001

Related U.S. Application Data (60) Provisional application No. 60/184,093, filed on Feb. 22, 2000, provisional application No. 60/186,556, filed on Mar. 2, 2000.

(51) Int. Cl.
| | |
|---|---|
| G06F 7/00 | (2006.01) |
| G06F 17/30 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl. .................. 707/759; 707/803; 715/239

(58) Field of Classification Search .................. 707/1–3, 707/104.1, 102, 758, 803, 999.003, 999.1, 707/759, 999.001, 999.102; 715/513–514, 715/526, 236, 238, 239; 709/100
See application file for complete search history.

(56) References Cited

U.S. PATENT DOCUMENTS

| | | | | |
|---|---|---|---|---|
| 6,766,330 | B1 * | 7/2004 | Chen et al. .......................... 1/1 |
| 7,089,249 | B2 * | 8/2006 | Kobayashi et al. ............. 707/10 |
| 2002/0016909 | A1 * | 2/2002 | Miyajima ........................ 713/2 |
| 2002/0032706 | A1 * | 3/2002 | Perla et al. ..................... 707/530 |
| 2002/0133412 | A1 * | 9/2002 | Oliver et al. ................... 705/26 |
| 2002/0198874 | A1 * | 12/2002 | Nasr et al. ........................ 707/3 |
| 2003/0197719 | A1 * | 10/2003 | Lincke et al. ................. 345/710 |
| 2007/0016909 | A1 * | 1/2007 | Gautier ........................ 719/310 |

OTHER PUBLICATIONS

Wireless Application Protocol Forum, Ltd. 2000, "Wireless Application Protocol Wireless Markup Language Specification," Version 1.3, Feb. 19, 2000, 110 pages.

Clark, J. (editor), "XSL Transformations (XSLT)," Version 1.0, W3C Recommendation Nov. 16, 1999, [online] [retrieved Feb. 28, 2001]. Retrieved from the internet: <URL:http://www.w3org/TR/xslt>.

Clark, J. and DeRose, S. (editors),"XML Path Language (XPath)," Version 1.0, W3C Recommendation Nov. 16, 1999, [online]. [retrieved Feb. 28, 2001]. Retrieved from the internet: <URL:http://www.w3.org/TR/xpath>.

Bray, J. et al. (editors), "Extensible Markup Language (XML) 1.0," W3C Recommendation Feb. 10, 1998, [online] [retrieved Feb. 28, 2001]. Retrieved from the Internet: <URL:http://www.w3.org/TR/1998/REC-xml-19980210>.

* cited by examiner

*Primary Examiner* — Mohammad Ali
*Assistant Examiner* — Patrick Darno
(74) *Attorney, Agent, or Firm* — Fenwick & West LLP (57) ABSTRACT

A rendering engine dynamically renders content that includes query expressions. The query expressions are resolved by extracting data from a data source. The resolutions to the queries are rendered with the content, according to rules associated with the content.

26 Claims, 5 Drawing Sheets

DYNAMIC RENDERING OF CONTENT THAT INCLUDES QUERY EXPRESSIONS

CROSS-REFERENCE TO RELATED APPLICATIONS

This application claims priority under 35 U.S.C. §119(e) from U.S. Provisional Patent Application Ser. No. 60/184,093, filed Feb. 22, 2000, and from U.S. Provisional Patent Application Ser. No. 60/186,556, filed Mar. 2, 2000. The entireties of both above-referenced Provisional Patent Applications are herein incorporated by reference.

FIELD OF INVENTION

This invention relates generally to rendering of content in a computer system, and specifically to dynamic rendering of markup language content that includes query expressions.

BACKGROUND OF INVENTION

Markup languages such as Hyper Text Markup Language (HTML) are commonly utilized today in order to describe and control how data is output to users of computing devices. For example, markup languages are used to describe web pages to be displayed by a browser, or screens to be displayed on a wireless, handheld computing device. As is known by those skilled in the art, markup languages generally comprise a series of tags, each of which can be associated with data. A tag can classify the data associated therewith, and tags can be associated with actions or behaviors. A markup language file is read by a rendering engine, which parses the markup language, identifies tags and associated data, and presents the corresponding output to a user according to the content of the markup language. For example, in HTML the tag <p> indicates the beginning of a paragraph, and the tag </p> indicates the end of a paragraph. When the tag <p> is encountered by a rendering engine, the rendering engine treats the subsequent data as a paragraph, until it encounters the tag </p>. Thus, the data between the <p> and </p> tags are presented to the user as a paragraph.

Markup languages are a useful way to describe the presentation of data, but they do have shortcomings. Often, it is necessary to perform the same action many times with different data. For example, suppose a truck driver who delivers grocery orders carries a hand held computing device containing information concerning each delivery on the driver's route. In order to execute a delivery, the driver consults a series of screens on the hand held device, each screen being generated by rendering markup language. To make a delivery, the driver would first view a screen with the name, address and phone number of the customer. Next, the driver would view a screen detailing the order, so that the driver could select the proper items from his truck. The next screen would allow the driver to process any items the customer wished to return. Another screen would allow the driver to record any items missing from the customer's order. Finally, another screen would process the payment.

As will be readily apparent, the same general screens would need to be replicated for each customer on the driver's route, but with different data each time. In order to do this with existing markup language technology, the same tag sets need to be repeated for each customer. This is not only very labor intensive and inefficient, but it is prone to error as well. For example, if a change is desired to an existing screen, the markup language pertaining to each instance of that screen must be edited. Often, one or more instances of a screen could inadvertently be omitted from this manual update procedure, such that the change would be applied for some but not all of the customers. Obviously, this is not acceptable.

Another shortcoming with existing markup languages is that data are associated with specific instances of tags such that the data cannot be reused without explicitly drafting additional markup language. If data are dissociated from their tags, the semantics are lost. For example, information concerning customers, orders and delivery items becomes meaningless once severed from the tags governing the display of that data in a specific and singular manner. As markup language is used today, information embedded within specific markup (e.g., customer, order, delivery time) is not reused because there is no automated, general-purpose way to determine the content of the information itself, for example which <p> element comprises a customer name and which the description of a carton of milk.

Yet another shortcoming with markup language is the need for the rendering computing device to be in contact with a server computer in order to process new data. To illustrate, suppose the truck driver in the example above needs to input the items that a specific customer wishes to return, or that are missing from the order. The screens generated from the markup language on the hand held device can not display this data, as this data is absent from the markup language. Instead, new markup language describing the items the customer entered would have to be drafted. To achieve this, generally the hand held computing device would have to transmit the data to a server computer, where new markup language would be created describing a screen that includes the newly entered items. The new markup language would then have to be transmitted back to the hand held device, and rendered locally to present the new screen. This is problematic, because communication with a server can be slow and expensive, especially over a wireless device where available bandwidth is limited. Worse yet, if the truck driver is located in a radio blackout zone, communication with a server is not possible at all.

What is needed is a method whereby the rendering and presentation of markup language allows for variable content, such that the same block of markup language can be used to describe the presentation of multiple data sets. In other words, a method is needed whereby a single block of markup language can be rendered so as to present, for example, a screen describing a customer's grocery list, for any customer and any list, without recoding the markup language or repeating the block. Additionally, the method should be able to embed information in markup language in a manner whereby the semantics of the information are preserved, such that the information can be referenced and used in multiple places in a single application, as well as in multiple applications. Furthermore, the method needs to be able to process new data in real-time, without requiring updated markup language, for example from a server computer.

SUMMARY OF INVENTION

The present invention enables dynamic rendering of content that includes query expressions. In one embodiment, a rendering engine receives requests for content from a user. The rendering engine parses content from a content source which includes query expressions. When the rendering engine encounters a query expression, the rendering engine passes the query expression to a query resolver, which extracts data from a data source in response to the query. The query resolver constructs a resolution to the query based upon the extracted data, and returns the resolution to the rendering engine. The rendering engine renders the resolution with the content, according to rules associated with the content in which the query was embedded. The rendering engine outputs rendered content to the user, responsive to the request.

The features and advantages described in this summary and the following detailed description, are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

High Level System Overview

Figure 1:
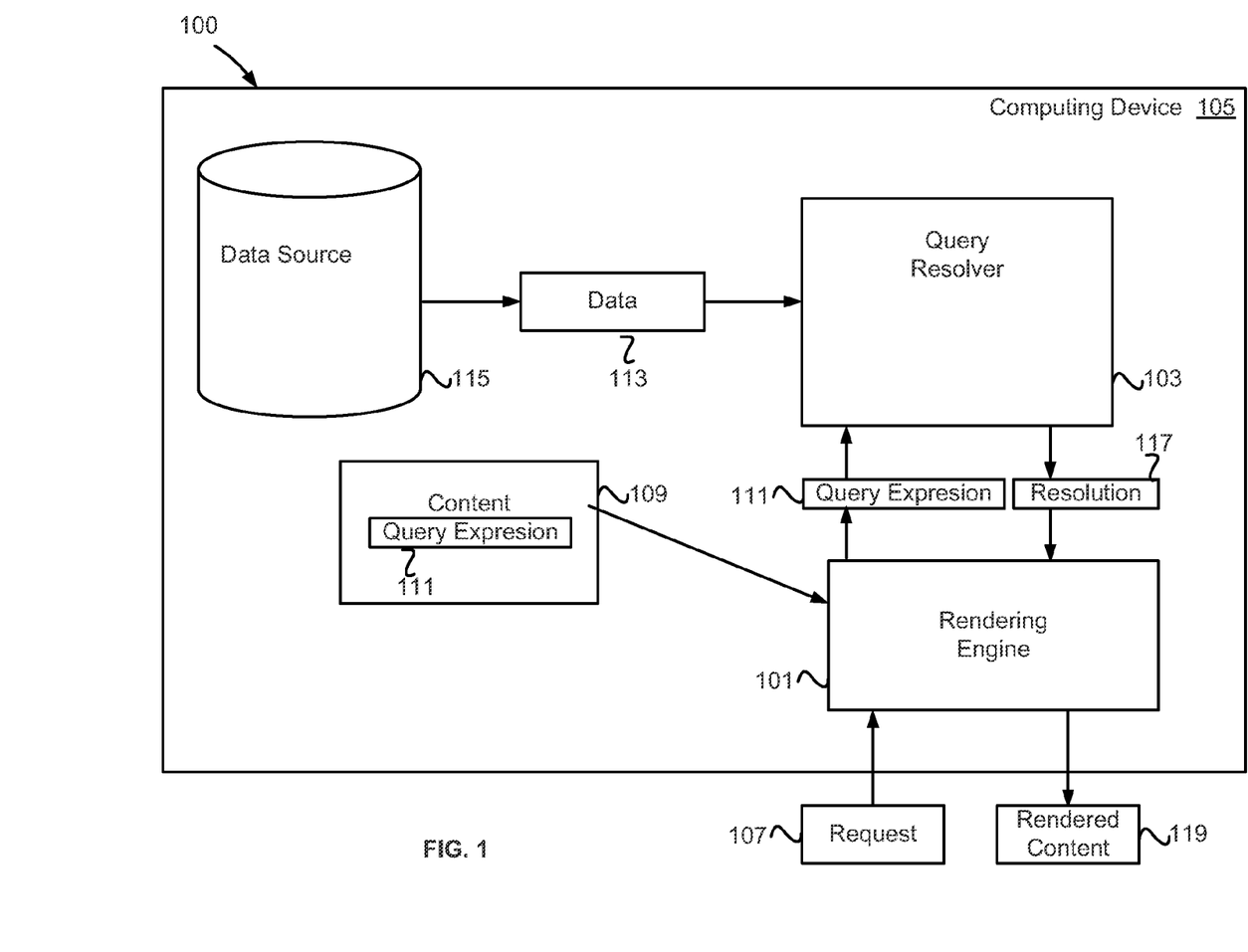
FIG. 1 is a high level block diagram illustrating a system for dynamically rendering content that includes query expressions, according to one embodiment of the present invention.

FIG. 1 is a high level block diagram illustrating a system 100 for dynamically rendering content that includes query expressions, according to one embodiment of the present invention. A rendering engine 101 and a query resolver 103 are present in a computing device 105. In one embodiment, the rendering engine 101 and query resolver 103 are instantiated as software that executes in the memory of a computing device 105 such as a microcomputer or a hand held device. Of course, the rendering engine 101 and query resolver 103 can be implemented as software, hardware, firmware, or any combination of the three as desired. The rendering engine 101 and query resolver 103 are described and illustrated as separate modules, but it is to be understood that this functionality can be instantiated in a single module, or in multiple modules and/or executable images as desired.

Responsive to a request 107, generally from a user operating the computing device 105, the rendering engine reads content 109 that includes at least one unresolved query expression 111. The rendering engine 101 identifies a query expression 111, and passes it to the query resolver 103. Based on the query expression 111, the query resolver 103 extracts data 113 from a data source 115. The query resolver 103 uses this data 113 to construct a resolution 117 to the query expression 111, which the query resolver returns to the rendering engine 101. The rendering engine 101 proceeds to render the content 109 and the resolution 117 to the query expression 111, and to output the resulting rendered content 119, generally to the user who issued the original request 107. These elements and functions are described in greater detail below.

Rendering of Markup Language Content on a Hand Held Computing Device

Figure 2:
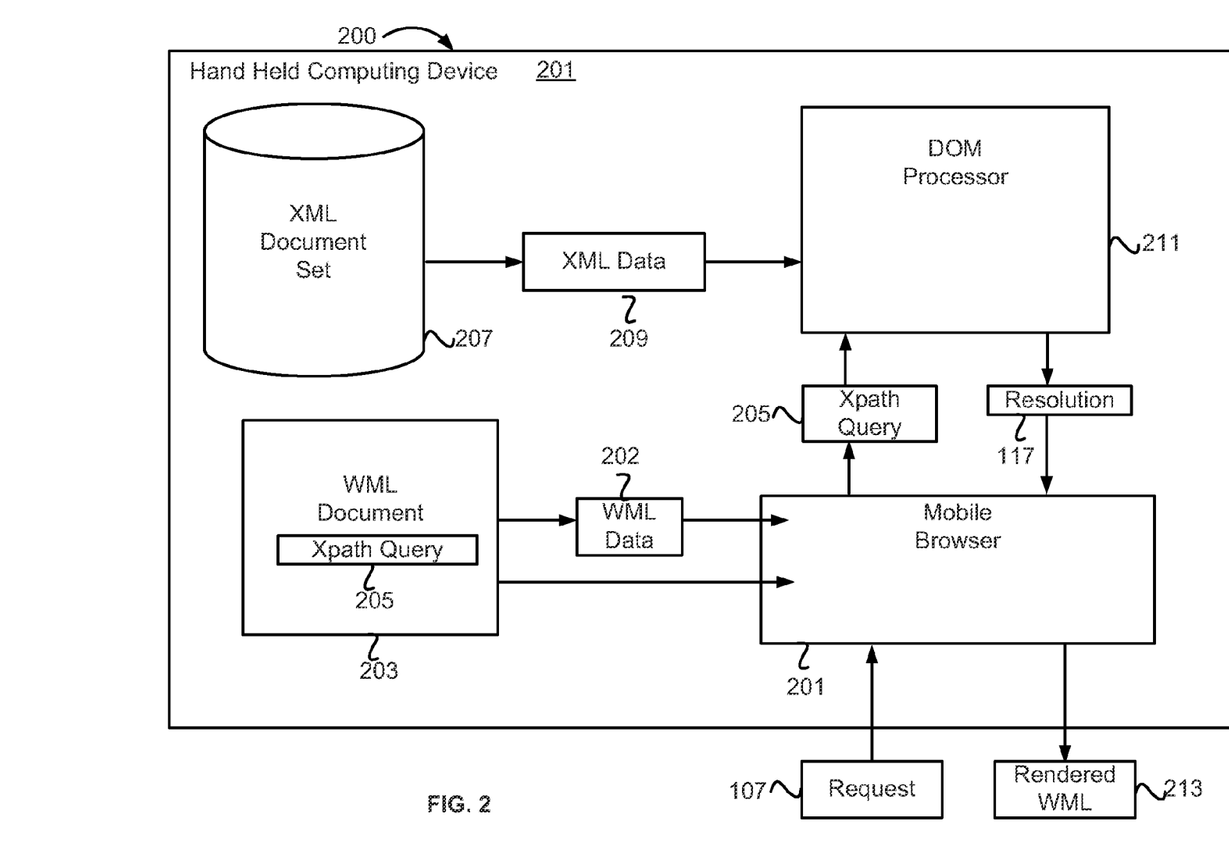
FIG. 2 is a block diagram illustrating a system for dynamic rendering of markup language content on a hand held computing device, according to one embodiment of the present invention.

FIG. 2 illustrates a system 200 for dynamic rendering of markup language content on a hand held computing device, according to one embodiment of the present invention. In the embodiment illustrated by FIG. 2, a user operating a hand held computing device 201 issues a request to view data to a mobile browser 201 running on the hand held computing device 201. In order to fulfill the request 107, the mobile browser 201 uses techniques known in the art to render content in a markup language. In FIG. 2, the mobile browser is illustrated rendering Wireless Markup Language (WML) data 202 that it reads from a WML Document 203. Of course, WML is only illustrated as an example, and in other embodiments other markup languages are utilized as desired.

WML is augmented according to the present invention such that at least one query expression 111 is embedded in the WML document 203. A query expression 111 comprises a request for data 113 from a data source 115, the data 113 to be rendered in place of the query expression 111 itself. When the query expression 111 is resolved (query resolution is described in detail below), the data that comprises the resolution 117 is substituted for the query expression 111, and rendered by the mobile browser 201.

Recall that markup language content comprises tags and associated data. Query expressions 111 are located in the markup content such that each query expression 111 is associated with a tag. Thus, when the resolution 117 is subsequently substituted for the query expression 111, the resolution 117 becomes associated with the tag with which the query expression is associated 111.

In FIG. 2, the query expression 111 illustrated is in the form of an XPath query 205. An XPath query 205 is a delimited token that conforms to a Extensible Markup Language (XML) standard known by those skilled in the art. An XPath query is used to extract nodes from an XML document set 207. In other words, an XPath query is a string that describes a request for XML data 209 from an XML document set 211. Of course, an XPath query 205 is only an example of a query expression, and in other embodiments of the present invention, other types of query expressions, for example database queries or Standard Query Language (SQL) expressions, are used as desired. Likewise, an XML document set 207 is only one example of a data source 115. In other embodiments, other types of data sources are used as desired, for example document sets in hierarchically structured formats other than XML, object oriented databases, or relational databases.

As the mobile browser 201 is rendering the WML document 203, it identifies a query expression 111. A query expression 111 is indicated by a symbol, identifiable to the browser 201. For example, an XPath query 205 is a token bounded by the delimiters "$ {" and "}". When the browser reads the opening delimiter, it treats subsequent data as an XPath query 205 until it reads the closing delimiter.

The browser 201 passes identified XPath queries 205 to the query resolver 103 for resolution. The example of a query resolver 103 that is illustrated in FIG. 2 comprises a document object model (DOM) processor 211. The DOM processor 211 utilizes a technique known in the art to extract XML data 209 from an XML document set 207, based on the XPath query 205. The DOM processor 211 then constructs a resolution 117 to the XPath query 205 based upon the extracted XML data 209, by, for example, returning an XML node set, converting the XML node set into a string, or executing other forms of data conversion in a manner that will be readily apparent to one of skill in the art. The DOM processor 211 then passes the resolution 117 to the mobile browser 201. In another embodiment, the DOM processor 211 returns raw XML data 209 to the mobile browser 201, and the mobile browser 201 constructs the resolution 117 to the XPath query 205.

The mobile browser 201 proceeds to render the resolution 117, according to at least one rule associated with the tag with which the XPath query 205, and hence the resolution 117, is associated. In other words, the mobile browser 201 substitutes the resolution 117 for the XPath query 205, and renders the resolution 117 as part of the markup according to the semantics of the tag with which the resolution 117 is associated.

Some tags are associated with a rule directing a simple substitution of the resolution 117 (for example, the string value of the XML data 209) for the XPath query 205 in the WML content 203. An example of this could be a tag that directs the mobile browser to output a string to the screen of the hand held computing device 201. In this case, the mobile browser 201 would render the tag and its associated XPath query 205 by outputting the string value of the XML data 209 that satisfies the XPath query 205, as opposed to outputting the XPath query 205 itself.

Some tags are associated with more complicated rules concerning resolution 117 rendering. For example, the resolution 117 of an XPath query 205 can be in the form of a set of nodes from an XML document set 207. For some tags, an appropriate rule will be for the browser 201 to repeat an action associated with the tag for each node in the node set comprising the resolution 117.

For example, markup language can be used to describe a table of data. Suppose an online retailer wants to use WML to describe a catalog of candles available for purchase. This catalog could be described as a table, the table being logically composed of records (rows) and fields (columns). Each row describes an entry in the table, and each column describes an attribute of the record type. In the present example, each record describes a candle in the catalog. Each record comprises three fields, the first containing an order number for the candle, the second containing a written description of the candle, and the third containing the price.

As is known to those of skill in the art, in order to describe such a catalog in WML, the table, tr (table row) and td (table data) tags could be used to describe a table comprising the catalog, and the table's records and fields respectively. Without the present invention, the tr tag would have to be repeated for each entry in the catalog, and the td tag would have to be repeated for each attribute of each entry. This is illustrated by the following WML fragment, which describes a table listing partial contents of the hypothetical candle catalog.

```
<table>
  <tr>
    <td>14756</td>
    <td>Vanilla votive candle</td>
    <td>$0.50</td>
  </tr>
  <tr>
    <td>14732</td>
    <td>Apple votive candle</td>
    <td>$0.50</td>
  </tr>
  <tr>
    <td>14885</td>
    <td>Pine votive candle</td>
    <td>$0.50</td>
  </tr>
  <tr>
    <td>14375</td>
    <td>Cinnamon votive candle</td>
    <td>$0.50</td>
  </tr>
</table>
```

By utilizing the present invention, this repetition becomes unnecessary. Instead, the following WML that contains XPath queries 205 is utilized:

```
<table>
  <tr>
    <td>${file:///CandleCatalog.xml/Items/Item/No}</td>
    <td>${file:///CandleCatalog.xml/Items/Item/Desc}</td>
    <td>${file:///CandleCatalog.xml/Items/Item/Price}</td>
  </tr>
</table>
```

As will be apparent to one of skill in the art, the XPath query 205 "${file:///CandleCatalog.xml/Items/Item/No}" resolves to a set of nodes, the set of nodes including every node in an XML document set 207 pertaining to a catalog number of an entry in the candle catalog. Likewise, the XPath queries 205 "${file:///CandleCatalog.xml/Items/Item/Desc}" and "${file:///CandleCatalog.xml/Items/Item/Price}" resolve to node sets including nodes pertaining to the written description and price respectively of each candle in the catalog.

In order to render the above markup language, a rule is associated with the td tag directing the browser 201 to render the tag for each node in the node set that satisfies the associated XPath query 205. Rather than having to draft a separate tr tag for each record in the catalog, and then having to draft a separate td tag for each field of each record, a single td tag describes a given field of each record in a table. Thus, when the mobile browser 201 encounters the XPath query 205 "${file:///CandleCatalog.xml/Items/Item/No}" in our example, the browser 201 applies the rule associated with the td tag, and, for each node in the resolution 117, sets the catalog number field of an associated record in the table to be the catalog number contained in that node. Then, when the browser 201 encounters the "${file:///CandleCatalog.xml/Items/Item/Desc}" and "${file:///CandleCatalog.xml/Items/Item/Price}" XPath queries 205, the browser 201 sets description and price fields of table entries based on the content of the nodes in the resolutions 117 of those XPath queries 205.

More generally, to render the resolutions 117 of XPath queries 205 associated with a td tag, the browser 201 calculates the number of records in the table from the cardinality of the node sets that satisfy the query expressions. In other words, the browser 201 knows how many records to create based on the number of nodes present in the resolutions 117. The number of records is equal to the number of nodes in the largest set. The browser 201 then populates the fields of each record with the string value of the corresponding node in the node set. If there are more records in the table than nodes in a node set associated with a particular field, the extra fields are left blank.

By rendering the resolutions 117 to the XPath queries 205 in the above example according to this rule, the browser 201 would create a table of four records, each with a catalog number, description, and price field, the fields being set to the corresponding data in the XML document set 207. The result is identical to that achieved by rendering the much longer WML fragment that does not include XPath queries 205. However, if the present invention is utilized, much less WML needs to be drafted, making the development cycle far more efficient.

Additionally, the present invention allows the existing WML to describe tables with more or fewer or entirely different records, simply by substituting another XML document set 207. In order to change a table described by WML without using the present invention, a developer would have to modify the WML itself. Such development is complicated, expensive and prone to error.

Furthermore, the data are left in a semantically meaningful form, which is not driven by or dependent on the markup language itself. Therefore, the data can be reused and re-referenced as desired.

One skilled in the art will readily appreciate that the rules associated with tags described above are examples only. The present invention contemplates defining and applying a variety of rules associated with a variety of tags, so that content in a markup language that includes query expressions 111 can be dynamically rendered. The exact rules associated with specific tags are a design choice, and will vary depending upon the nature of the markup language, query expressions 111, and resolution 117 types. All rendering of resolutions 117 to query expressions 111 according to rules associated with directives associated with the query expressions 111 is within the scope of the present invention, regardless of the specific rules in question.

Returning to FIG. 2, as XPath queries 205 are resolved and the underlying WML document 203 is dynamically rendered by the mobile browser 201, the rendered WML 213 is presented to the user operating the hand held computing device 201. To continue the example of the candle catalog, if a user issues a request 107 to view the price of a specific candle in the catalog, the price of that candle would be read from the dynamically constructed table described above, and presented to the user on the screen of the hand held computing device 201.

Rendering of HTML on a Microcomputer

Figure 3:
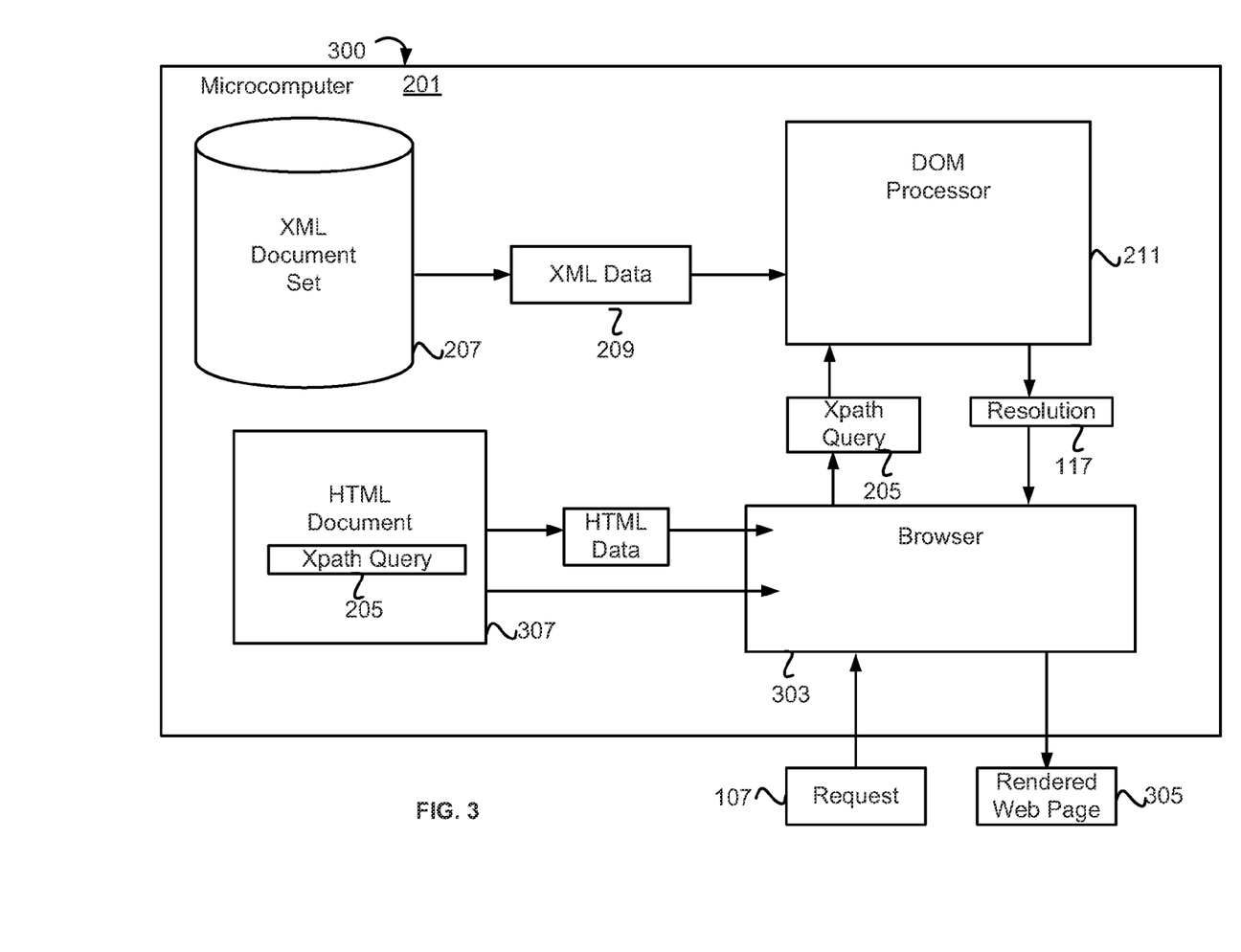
FIG. 3 is a block diagram illustrating a system for dynamic rendering of markup language content on a microcomputer, according to one embodiment of the present invention.

FIG. 3 illustrates a system 300 for dynamic rendering of markup language content on a microcomputer 301, according to one embodiment of the present invention. The embodiment illustrated in FIG. 3 is similar to the embodiment illustrated in FIG. 2, except that the markup language is dynamically rendered on a microcomputer 301 instead of on a hand held computing device 201.

In the embodiment illustrated by FIG. 3, a user of a microcomputer 301 issues a request 107 to a browser 303, for example a request to view a web page 305. In order to fulfill the request 107, the browser 303 uses techniques known in the art to render content in a markup language, such as an HTML document 307, as illustrated. Included within the HTML document is at least one query expression 111, for example an XPath query 305 as illustrated.

The browser 303 reads HTML data 309 until an XPath query 305 is encountered. As described concerning the embodiment illustrated by FIG. 2, the browser 303 passes the XPath query 305 to the DOM processor 211, which in turn extracts XML data 209 from an XML document set 207 based on the XPath query 305. The DOM processor 211 utilizes the xml data 209 to construct a resolution 117 to the XPath query 305, and returns the resolution 117 to the browser 303.

The browser 303 renders the resolution 117 according to at least one rule associated with the tag with which the resolution 117 is associated, as described above. As the browser 303 renders the HTML document 307 and the resolutions 117 to XPath queries 305 therein, the browser outputs rendered web pages 305 to the user.

Query Expressions that Contain Variables

Figure 4:
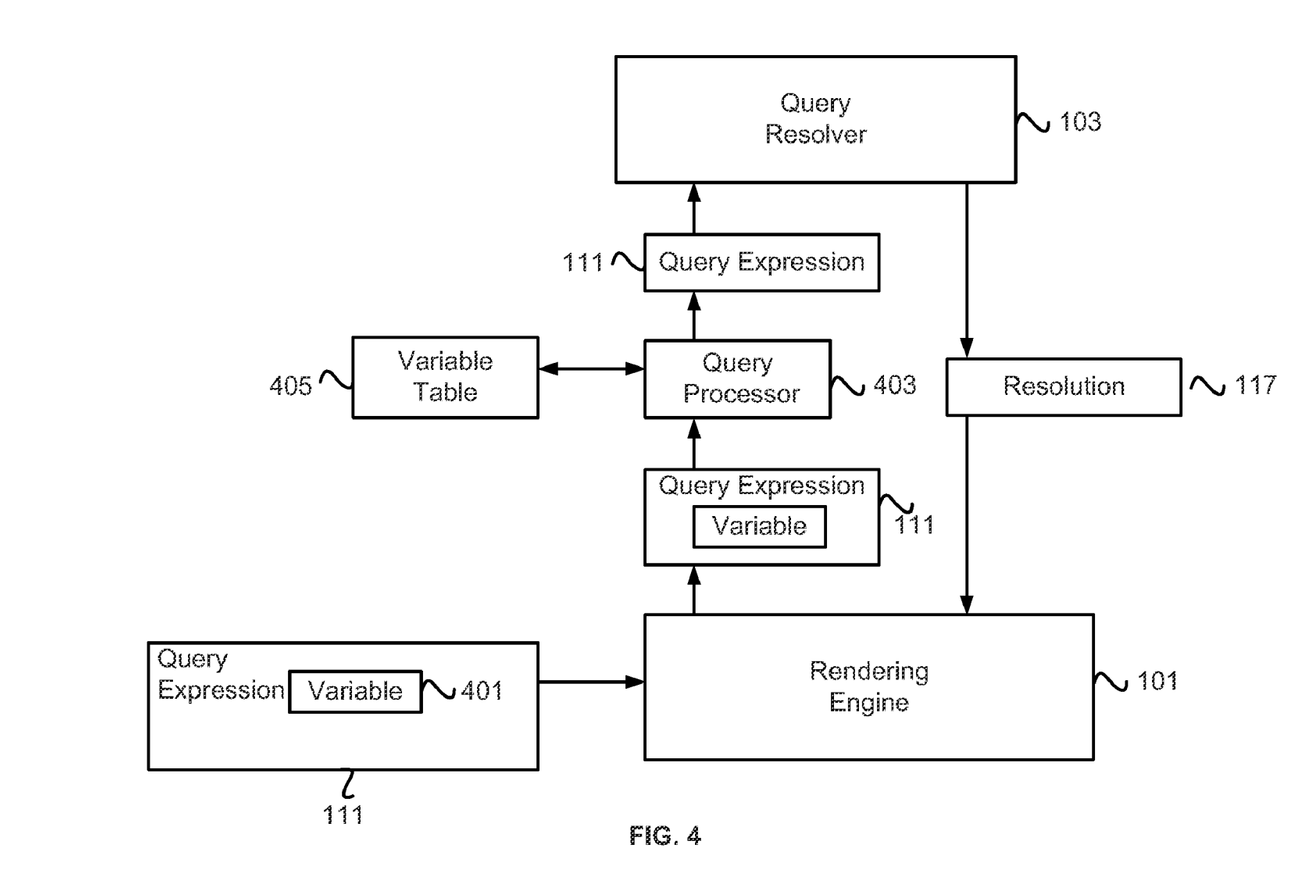
FIG. 4 is a block diagram illustrating the use of variables within query expressions, according to one embodiment of the present invention.

FIG. 4 illustrates an embodiment of the present invention in which query expressions 111 can contain variables 401. A variable 401 in a query expression is generally in the form of a delimited token or similar syntax recognizable to the rendering engine 101.

In one embodiment, the content is in a markup language without built in variable 401 support, such as HTML. In this embodiment, a variable table 405 or similar data structure is maintained, as illustrated in FIG. 4. When the rendering engine 101 encounters a query expression 111, the rendering engine 111 passes the query expression 111 to a query processor 403. FIG. 4 illustrates the query processor 403 as a separate module, but it is to be understood that the functionality associated with the query processor 403 can be combined with or separate from the rendering engine 101 and/or the query resolver 103 as desired.

The query processor 403 identifies variables 401 within received query expressions 111, and locates the identified variables 401 in the variable table 405. The variable table 405 contains the names and values of all variables 401 that have been set for use by the system 100. For each identified variable 401, the query processor 403 substitutes the value from the variable table 405 for the symbol representing the value (the variable 401 name) in the query expression 111. The query processor 101 proceeds to pass the resulting completed query expression 111 to the query resolver 103, which processes the query expression 111 as described above, and returns a resolution 117 to the rendering engine 101.

To set a variable 401 in a markup language without built in variable support, some syntax is utilized in the markup itself. For example, the following markup language fragment could be used to create a variable 401 with the name example, and to set its value to http://www.example.com/example.xml, where the url "http://www.example.com/example.xml" points to a document that is the root of an XML node set.

<load name="example"
value="http://wwvv.example.com/example.xml">

In order to set variables 401 using the above syntax, the rendering engine 101 is programmed in a manner that will be readily apparent to one of skill in the art to process the load tag. When the rendering engine 101 encounters a load tag, the rendering engine 101 creates a variable 401 by adding an entry to the variable table 405 with the name to the right of the equals sign following "name," and the value to the right of the equals sign following "value." Of course, the above syntax is merely an example, and the same result can be achieved utilizing other tags or syntax as desired.

In one embodiment, variables 401 are set to the root node, or alternatively to a child node, of an XML document set 207. This allows variables 401 to be bound to specific nodes in hierarchical data structures. The variables 401 can then be made to point to new documents simply by changing the XML document set 207 to which the variable 401 is bound.

In one embodiment, the markup language or other content 109 in which the query expression 111 is embedded supports limited variable 401 use. An example of a markup language that supports limited use of variables is WML, which supports variables of type string only. In this embodiment, the markup language is augmented as described above to support variables of other data types as desired, for example numeric, node set and Boolean. Where the markup language provides limited variable support, the markup language generally will provide a variable table 405, so in this embodiment the existing variable table 405 is used to store variables of all types.

In yet another embodiment, the markup language or other content 109 in which the query expression 111 is embedded supports the use of variables 401 of all desired types. In this embodiment, the rendering engine 101 simply resolves variables 401 within query expressions 111 by utilizing the variable resolution functionality that is built into the markup language.

The use of variables 401 in query expressions 111 is a notational convenience. For example, recall the online candle catalog described above. As previously explained, the following XPath query 205 resolves to every node in an XML document set 207 describing a catalog number field of a record in the candle catalog:

${file:///CandleCatalog.xml/Items/Item/No}

This syntax is convenient, but it is limited to describing the candle catalog. If other catalogs of similar structure are to be described, without the use of variables 401, new markup language would need to be drafted. However, the text "CandleCatalog" in the XPath query 205 can be replaced with a variable 401 called, for example, "catalog" and set to the value of the root node of the candle catalog in the XML document set 207. Then, if the same markup language is to be used to described another catalog, for example a computer catalog, the document set 207 bound to the variable 401 could simply be replaced with the document set 207 for the new catalog, providing that both catalogs conform to the same schema or document type.

Dynamic Updating of the Data Source

Figure 5:
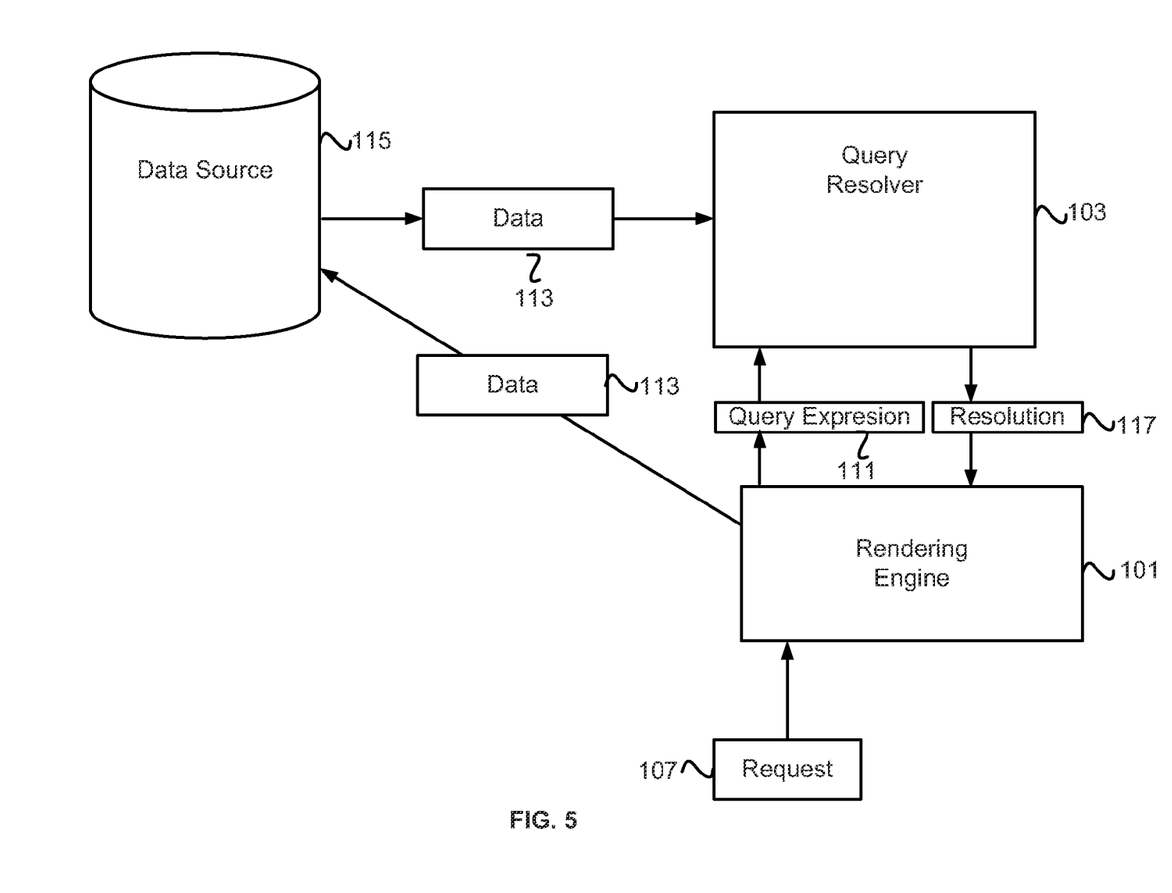
FIG. 5 is a block diagram illustrating updating a data source while rendering content that includes query expressions, according to one embodiment of the present invention.

FIG. 5 illustrates an embodiment of the present invention in which the rendering of content 109 that includes query expressions 111 involves updating the data source 115. Sometimes, a rule associated with a tag with which a resolution 117 is associated will direct the rendering engine 101 to render data gleaned from the user. For example, suppose a user orders candles from the online catalog discussed above. It would be desirable to present to the user a screen displaying the items ordered and the shipping information for confirmation. Absent the present invention, preexisting markup language cannot describe such a screen, because the content is not know when the markup language is drafted and loaded onto the computing device 105. Traditionally, the data 113 entered by the user would be transmitted to a server, where new markup language describing the conformation screen would be created and subsequently transmitted to the user. The present invention enables the dynamic generation of the screen without requiring connection to a server.

The present invention achieves this result by placing a query expression 111 in the markup language. The query expression 111 resolves to a location in a data source 115 (for example a node in an XML document set 207) where information gleaned from the user can be stored. Markup language associated with the query expression 111 directs the rendering engine 101 to prompt the user for the data 113. When the user enters the data 113, the rendering engine 101 (or alternatively the query resolver 103 or query processor 403) stores the data in the data source 115 according to the resolution 117.

The rendering engine 111 subsequently renders markup language to display the confirmation screen. This markup language is associated with the query expression 111 that will resolve to the location in the data source 115 of the data 113 entered by the user. Thus, the rendering engine 101 is able to output the conformation screen that includes the user entered data 113, without having to be connected to a server, and without the need for the development of new markup language describing the completed conformation screen.

It will be readily apparent that with the present invention, the same preexisting markup language can be used to describe multiple instances of a common type, for example an order screen that can be used to confirm any user's order. As described above, the markup language directs the rendering engine 101 to prompt the user for the information to be included in the screen. Through the use of query expressions 111 in the markup, this data 113 is stored in the data set 115 and dynamically presented to the user.

CONCLUSION

It will be readily understood by those skilled in the art that the present invention is not limited to rendering markup language. In some embodiments the content 109 that includes query expressions 111 can be markup language, but in other embodiments the content can comprise other formats, for example SQL, ASCII text or the format of a proprietary word processor as desired. As will also be understood by those familiar with the art, the invention may be embodied in other specific forms without departing from the spirit or essential characteristics thereof. Likewise, the particular capitalization or naming of the modules, protocols, features, attributes or any other aspect is not mandatory or significant, and the mechanisms that implement the invention or its features may have different names or formats. Additionally, it will be readily apparent to one of skill in the art that functionality described herein can be implemented as software, hardware, firmware or any desired combination thereof. Embodiments of the present invention can comprise computer program products comprising program codes stored on a computer-readable storage medium. All such instantiations are within the scope of the present invention. Accordingly, the disclosure of the present invention is intended to be illustrative, but not limiting, of the scope of the invention, which is set forth in the following claims.

What is claimed is:

1. A computer implemented method for dynamically rendering data in a markup language document represented in a markup language, the method comprising:

identifying a symbol in the data in the markup language document, the symbol indicating a query of a data set from a data source, the query containing one or more variables, wherein the query is associated with a markup language tag in the markup language document, the markup language document for rendering and the markup language tag specifying rendering of a portion of the markup language document; and the markup language is augmented with a variable resolution functionality to support the variables, each variable resolving to two or more variable values;

accessing the data set in order to generate a resolution to the query, wherein the one or more variables contained in the query are resolved as part of the generation of the resolution to the query;

substituting the two or more variable values for each variable into the query to generate two or more completed queries;

dynamically rendering the resolution to the two or more completed queries together as a part of rendering of the markup language document, according to at least one rule associated with the markup language tag; and receiving input data for updating information rendered using the resolution to the query and storing the input data in the data source at a location determined using the resolution to the query.

2. The method of claim 1, wherein:
the symbol comprises a delimited token.

3. The method of claim 1 wherein:
the symbol is located within the data in the markup language document, the markup language document for rendering the data.

4. The method of claim 3 wherein:
the markup language comprises Hyper Text Markup Language.

5. The method of claim 3 wherein rendering further comprises:
rendering the resolution according to a semantics of the markup language tag with which the query is associated.

6. The method of claim 1 wherein:
the data set comprises a set of at least one document in a hierarchically structured format.

7. The method of claim 6 wherein:
the hierarchically structured format comprises Extensible Markup Language.

8. The method of claim 7 wherein:
the symbol conforms an Extensible Markup Language standard concerning queries.

9. The method of claim 1 wherein:
the data set comprises a database.

10. The method of claim 1 wherein:
rendering is performed by software running on a hand held computing device.

11. The method of claim 1 further comprising:
generating a resolution to the query by retrieving a node set from a set of documents in Extensible Markup Language; and
rendering each member of the node set.

12. The method of claim 1 wherein:
each variable contained in the query comprises a token bounded by delimiters.

13. The method of claim 1 wherein rendering the resolution further comprises:
receiving an input from a user;
responsive to receiving the input, updating the data set based at least in part on the received input.

14. The method of claim 3 wherein:
the markup language comprises Wireless Markup Language.

15. The method of claim 1 wherein augmenting the markup language with a variable resolution functionality to support the variables further comprises:
providing a variable table for storing names and values of the variables, each variable of one of the plurality of data types; and
utilizing a syntax in the markup language for creating the variables by adding the variables to the variable table.

16. The method of claim 1, wherein each completed query comprises a node and the at least one rule associated with the markup language tag directs rendering of each node belonging to each completed query as a cell of a rendered table.

17. A computer program product for dynamically rendering data in a markup language document represented in a markup language, the computer program product comprising:
program code for identifying a symbol in the data in the markup language, the symbol indicating a query of a data set from a data source, the query associated with a markup language tag in the markup language document, the markup language document for rendering and the markup language tag specifying rendering of a portion of the markup language document, the query containing one or more variables;

program code for augmenting the markup language to support the variables by building a variable resolution functionality into the markup language, each variable resolving to two or more variable values;

program code for accessing the data set in order to generate a resolution to the query, wherein the one or more variables contained in the query are resolved as part of the generation of the resolution to the query;

program code for substituting the two or more variable values for each variable into the query to generate two or more completed queries;

program code for dynamically rendering the resolution to the two or more completed queries together as a part of rendering of the markup language document, according to at least one rule associated with the markup language tag;

program code for receiving input data for updating information rendered using the resolution to the query and storing the input data in the data source at a location determined using the resolution to the query; and a computer readable medium on which the program codes are stored.

18. The computer program product of claim 17 further comprising:
program code for rendering the resolution according to a semantics of the markup language tag with which the query is associated.

19. The computer program product of claim 17 further comprising:
program code for generating a resolution to the query by retrieving a node set from a set of documents in Extensible Markup Language; and
program code for rendering each member of the node set.

20. The computer program product of claim 17 further comprising:
program code for:
receiving an input from a user;
responsive to receiving the input, updating the data set based at least in part on the received input.

21. The computer program product of claim 17, wherein each completed query comprises a node and the at least one rule associated with the markup language tag directs rendering of each node belonging to each completed query as a cell of a rendered table.

22. A computer system for dynamically rendering data in a markup language document represented in a markup language, the computer system comprising:
a computer-readable storage medium storing an executable computer program product comprising:
an identification module, for identifying a symbol in the data in the markup language document, the symbol indicating a query of a data set from a data source, the query associated with a markup language tag in the markup language document, the markup language document for rendering and the markup language tag specifying rendering of a portion of the markup language document, the query containing one or more variables, each variable of one of a plurality of data types, the markup language augmented with a variable resolution functionality to support the variables;

a data access module, for accessing the data set in order to generate a resolution to the query, wherein the one or more variables contained in the query are resolved as part of the generation of the resolution to the query, the data access module being coupled to the identification module, the data access module further adapted to substitute the two or more variable values for each variable into the query to generate two or more completed queries; and a rendering module, for dynamically rendering the resolution to the two or more completed queries together as a part of rendering of the markup language document, according to at least one rule associated with the markup language tag, the rendering module being coupled to the data access module, the rendering module further adapted to receive input data for updating information rendered using the resolution to the query and storing the input data in the data source at a location determined using the resolution to the query.

23. The system of claim 22 wherein:

the rendering module is further for rendering the resolution according to a semantics of the markup language tag with which the query is associated.

24. The system of claim 22 further comprising:

a resolution generation module, for generating a resolution to the query by retrieving a node set from a set of documents in Extensible Markup Language, the resolution generation module being coupled to the data access module; and the rendering module is further for rendering each member of the node set.

25. The system of claim 22 further comprising:

an updating module, for receiving an input from a user and responsive to receiving the input updating the data set based at least in part on the received input, the updating module being coupled to the rendering module.

26. The computer system of claim 22, wherein each completed query comprises a node and the at least one rule associated with the markup language tag directs rendering of each node belonging to each completed query as a cell of a rendered table.

* * * * *